US009718329B2

(12) United States Patent
Brinas (10) Patent No.: US 9,718,329 B2
(45) Date of Patent: Aug. 1, 2017

(54) AIRFLOW OUTLET ASSEMBLY AND A PASSENGER COMPARTMENT FOR A VEHICLE

(71) Applicant: GM GLOBAL TECHNOLOGY OPERATIONS LLC, Detroit, MI (US)

(72) Inventor: Gerard A. Brinas, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 248 days.

(21) Appl. No.: 14/739,328

(22) Filed: Jun. 15, 2015

(65) Prior Publication Data

US 2016/0361979 A1  Dec. 15, 2016

(51) Int. Cl.
*B60H 1/34* (2006.01)
*B62D 25/14* (2006.01)
(52) U.S. Cl.
CPC ......... *B60H 1/3442* (2013.01); *B62D 25/142* (2013.01); *B60H 2001/3478* (2013.01)
(58) Field of Classification Search
CPC .. B60H 1/3442; B60H 1/3428; B60H 1/3414; B60H 1/345; B60H 1/3421; B62D 25/142
USPC ........................................... 454/154; 138/45
See application file for complete search history.

(56) References Cited

U.S. PATENT DOCUMENTS

| 3,319,560 | A | * | 5/1967 | Schaaf | B60H 1/3442 239/582.1 |
| 2014/0120823 | A1 | * | 5/2014 | Brinas | B60H 1/34 454/155 |
| 2014/0230942 | A1 | * | 8/2014 | Takai | B60H 1/345 138/45 |
| 2014/0342657 | A1 | * | 11/2014 | Rais | F24F 13/065 454/358 |
| 2016/0031293 | A1 | | 2/2016 | Brinas | |
| 2016/0129761 | A1 | | 5/2016 | Brinas | |
| 2016/0129762 | A1 | | 5/2016 | Brinas | |

* cited by examiner

*Primary Examiner* — Steven B McAllister
*Assistant Examiner* — Allen Schult
(74) *Attorney, Agent, or Firm* — Quinn IP Law (57) ABSTRACT

An airflow outlet assembly and a passenger compartment for a vehicle includes a housing defining an aperture extending along a central axis. The housing includes a central support disposed in the aperture proximal to the central axis. First and second outlet components are at least partially disposed in the aperture of the housing. The first outlet component includes a first plate and a first vane extending outwardly from the first plate toward the central axis. The second outlet component includes a second plate and a second vane extending outwardly from the second plate toward the central axis. The first and second outlet components are rotatable concurrently with each other to change the position of the first and second plates and the first and second vanes relative to the housing such that the first and second plates selectively close and open the aperture.

20 Claims, 4 Drawing Sheets

AIRFLOW OUTLET ASSEMBLY AND A PASSENGER COMPARTMENT FOR A VEHICLE

TECHNICAL FIELD

The present disclosure relates to an airflow outlet assembly and a passenger compartment for a vehicle.

BACKGROUND

Many vehicles include a passenger compartment in which airflow into the passenger compartment can be controlled. For example, vents can control the amount of airflow into the passenger compartment. Vents can be adjustable to increase or decrease the amount of airflow into the passenger compartment, as well as control the direction that the airflow enters the passenger compartment.

One type of vent includes a housing defining an opening with a plurality of vanes fixed to the housing inside the opening. In other words, the vanes are stationary. Airflow can selectively move through the opening about the vanes. A pair of doors are movable relative to the housing behind the vanes, and movement of the doors change the amount of airflow through the opening and about the vanes. A rotary knob is operatively connected to a drive mechanism that moves the doors. Therefore, rotation of the rotary knob operates the drive mechanism and the drive mechanism operates the doors.

The doors are split in half such that each of the doors defines a half-circular configuration. Therefore, when the doors block the opening in a fully closed position, the doors cooperate to define a circle that is complementary to the diameter of the opening. When the doors are in a fully open position, the doors are folded in half adjacent to each other to define a half-circle, and this half-circular configuration requires a large packaging space inside the housing. As such, the fore-aft depth of the housing is large to accommodate the half-circular configuration of each of the doors when folded together in the fully open position.

SUMMARY

The present disclosure provides an airflow outlet assembly including a housing defining an aperture extending along a central axis. The housing includes a central support disposed in the aperture proximal to the central axis. The central support includes a first segment having a first axis substantially aligning with the first segment and a second segment having a second axis substantially aligning with the second segment. The first and second axes are each spaced from the central axis and each disposed transverse to the central axis. The assembly also includes a first outlet component at least partially disposed in the aperture of the housing and rotatably coupled to the central support about the first axis. The first outlet component includes a first plate and a first vane extending outwardly from the first plate toward the central axis. The assembly further includes a second outlet component at least partially disposed in the aperture of the housing and rotatably coupled to the central support about the second axis. The second outlet component includes a second plate and a second vane extending outwardly from the second plate toward the central axis. The first and second outlet components are rotatable concurrently with each other relative to the central support about the respective first and second axes to change the position of the first and second plates and the first and second vanes relative to the housing such that the first and second plates selectively close and open the aperture.

The present disclosure also provides a passenger compartment for a vehicle. The passenger compartment includes a dashboard and an airflow outlet assembly coupled to the dashboard. The assembly includes a housing defining an aperture extending along a central axis. The housing includes a central support disposed in the aperture proximal to the central axis. The central support includes a first segment having a first axis substantially aligning with the first segment, a second segment having a second axis substantially aligning with the second segment and a third segment having a third axis substantially aligning with the third segment. The first, second and third axes are each spaced from the central axis and each disposed transverse to the central axis. The assembly also includes a first outlet component at least partially disposed in the aperture of the housing and rotatably coupled to the central support about the first axis. The first outlet component includes a first plate and a first vane extending outwardly from the first plate toward the central axis. The assembly further includes a second outlet component at least partially disposed in the aperture of the housing and rotatably coupled to the central support about the second axis. The second outlet component includes a second plate and a second vane extending outwardly from the second plate toward the central axis. The assembly further includes a third outlet component at least partially disposed in the aperture of the housing and rotatably coupled to the central support about the third axis. The third outlet component includes a third plate and a third vane extending outwardly from the third plate toward the central axis. The first, second and third outlet components are rotatable concurrently with each other relative to the central support about the respective first, second and third axes to change the position of the first, second and third plates and the first, second and third vanes relative to the housing such that the first, second and third plates cooperate to selectively close and open the aperture.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that terms such as "above", "below", "upward", "up", "downward", "down", "top", "bottom", "left", "right", "back", "forth", etc., are used descriptively for the figures to aid the reader's understanding of the present disclosure, and do not create limitations, particularly as to the position, orientation, use of the disclosure or scope as defined by the appended claims. Furthermore, the term "substantially" can refer to a slight imprecision or slight variance of a condition, quantity, value, or dimension, etc., some of which that are within manufacturing variance or tolerance ranges.

Figure 1:
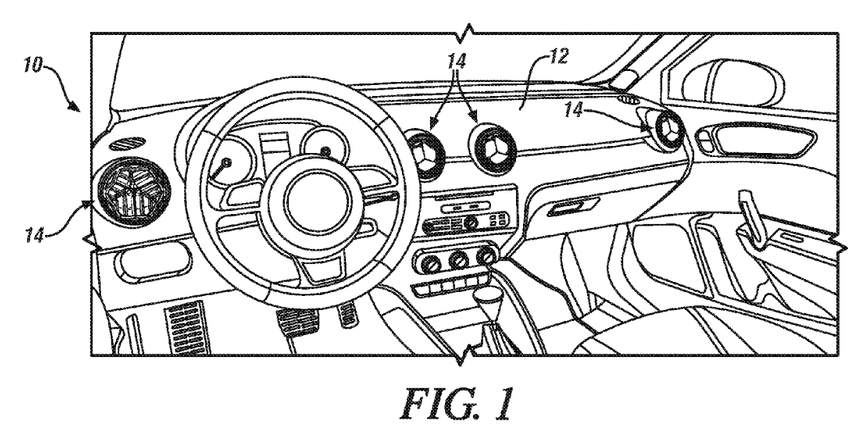
FIG. 1 is a schematic fragmentary perspective view of a passenger compartment with a plurality of airflow outlet assemblies attached to a dashboard, with one of the airflow outlet assemblies in a fully open position and three of the airflow outlet assemblies in a fully closed position.

Referring to the Figures, wherein like numerals indicate like or corresponding parts throughout the several views, a passenger compartment 10 for a vehicle is generally shown in FIG. 1.

Figure 2:
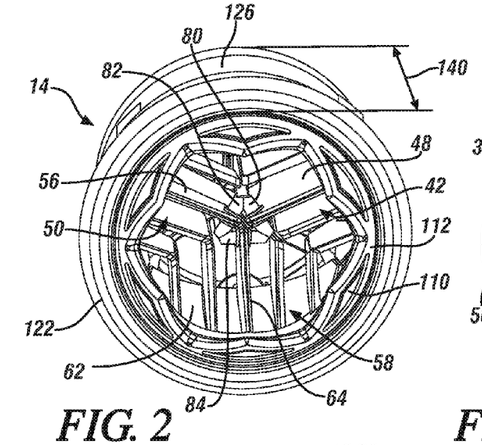
FIG. 2 is a schematic perspective view of an airflow outlet assembly compatible with the passenger compartment of FIG. 1.

Continuing with FIG. 1, the passenger compartment 10 can include a dashboard 12 and an airflow outlet assembly 14 coupled to the dashboard 12. The airflow outlet assembly 14 can be in fluid communication with the passenger compartment 10. The airflow outlet assembly 14 can also be in fluid communication with a heating, ventilation and air conditioning (HVAC) unit. Therefore, heated air, ambient air and/or cooled air can be delivered to the passenger compartment 10 through the airflow outlet assembly 14. As shown in FIG. 1, a plurality of airflow outlet assemblies 14 can be coupled to the dashboard 12. Each of the airflow outlet assemblies 14 can be in fluid communication with the HVAC unit and the passenger compartment 10. Each of the airflow outlet assemblies 14 are configured the same; therefore, for the below discussion one airflow outlet assembly 14, as best shown in FIG. 2, is described in detail.

Figure 3:
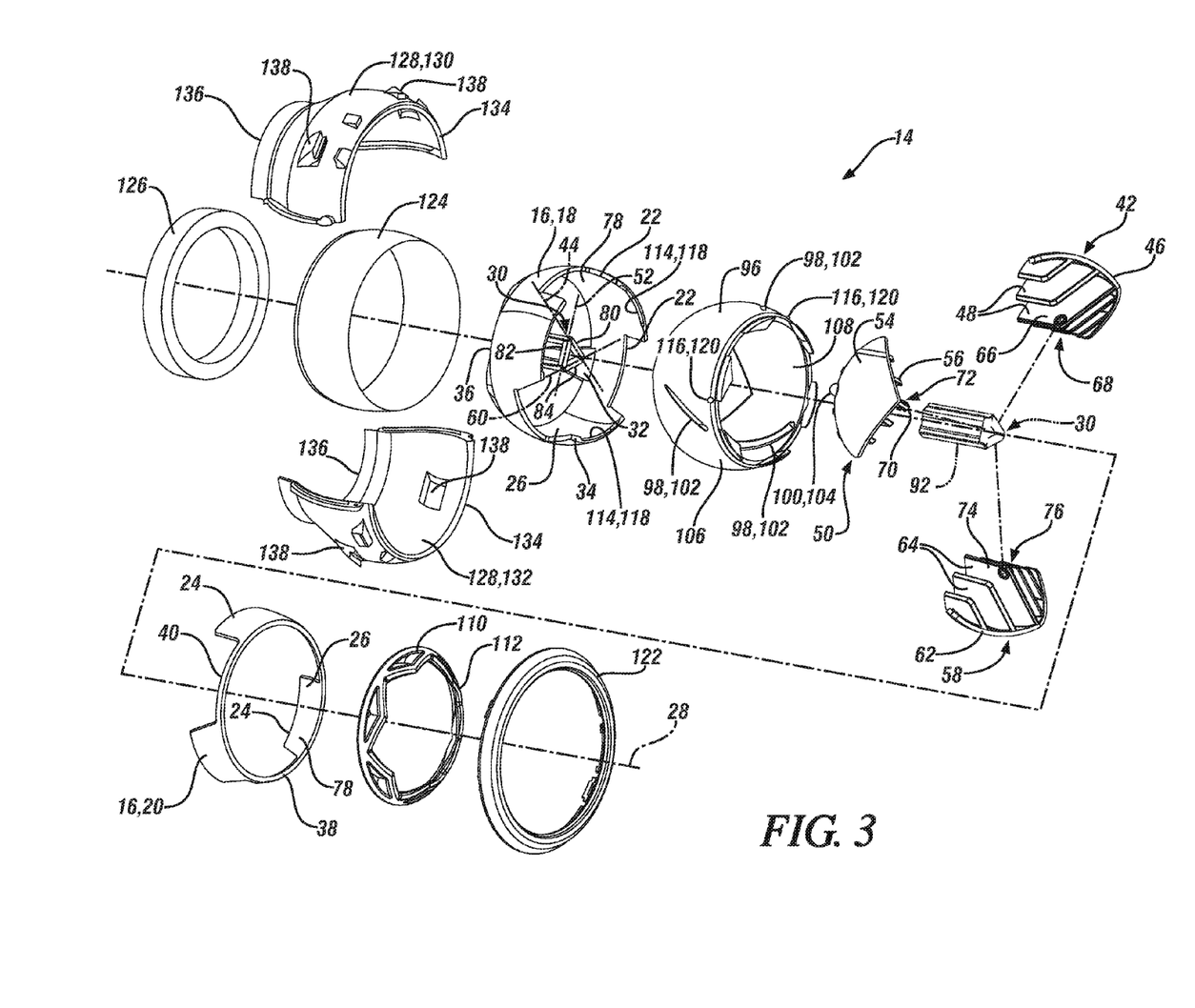
FIG. 3 is a schematic perspective exploded view of the airflow outlet assembly of FIG. 2.

Referring to FIG. 3, the airflow outlet assembly 14 includes a housing 16. The housing 16 can be formed as a single or unitary piece, or a plurality of pieces. For example, as best shown in FIG. 3, the housing 16 can include a first housing portion 18 and a second housing portion 20, i.e., a plurality of pieces. When formed of more than one piece, the first and second housing portions 18, 20 cooperate with each other.

Continuing with FIG. 3, one of the first housing portion 18 and the second housing portion 20 can define one or more cutouts 22 and the other one of the first housing portion 18 and the second housing portion 20 can include one or more tabs 24 cooperating with the respective cutouts 22. Therefore, one or more tabs 24 are disposed in one of the cutouts 22 to attach or secure the first and second housing portions 18, 20 together. For illustrative purposes only, the Figures illustrate the first housing portion 18 defining the cutouts 22 and the second housing portion 20 including the tabs 24. However, the first and second housing portions 18, 20 can be other configurations and include features other than the tabs 24 and cutouts 22 to attach or secure the first and second housing portions 18, 20 together, for example, one or more fasteners, clips, snaps, etc., can be utilized.

As best shown in FIG. 3, the housing 16 defines an aperture 26 extending along a central axis 28. Furthermore, the housing 16 includes a central support 30 disposed in the aperture 26 proximal to the central axis 28. The central support 30 is also shown in phantom lines in FIG. 3 to illustrate the orientation of the central support 30 relative to other features, which are discussed further below.

Figures 4, 6, 13, 16:
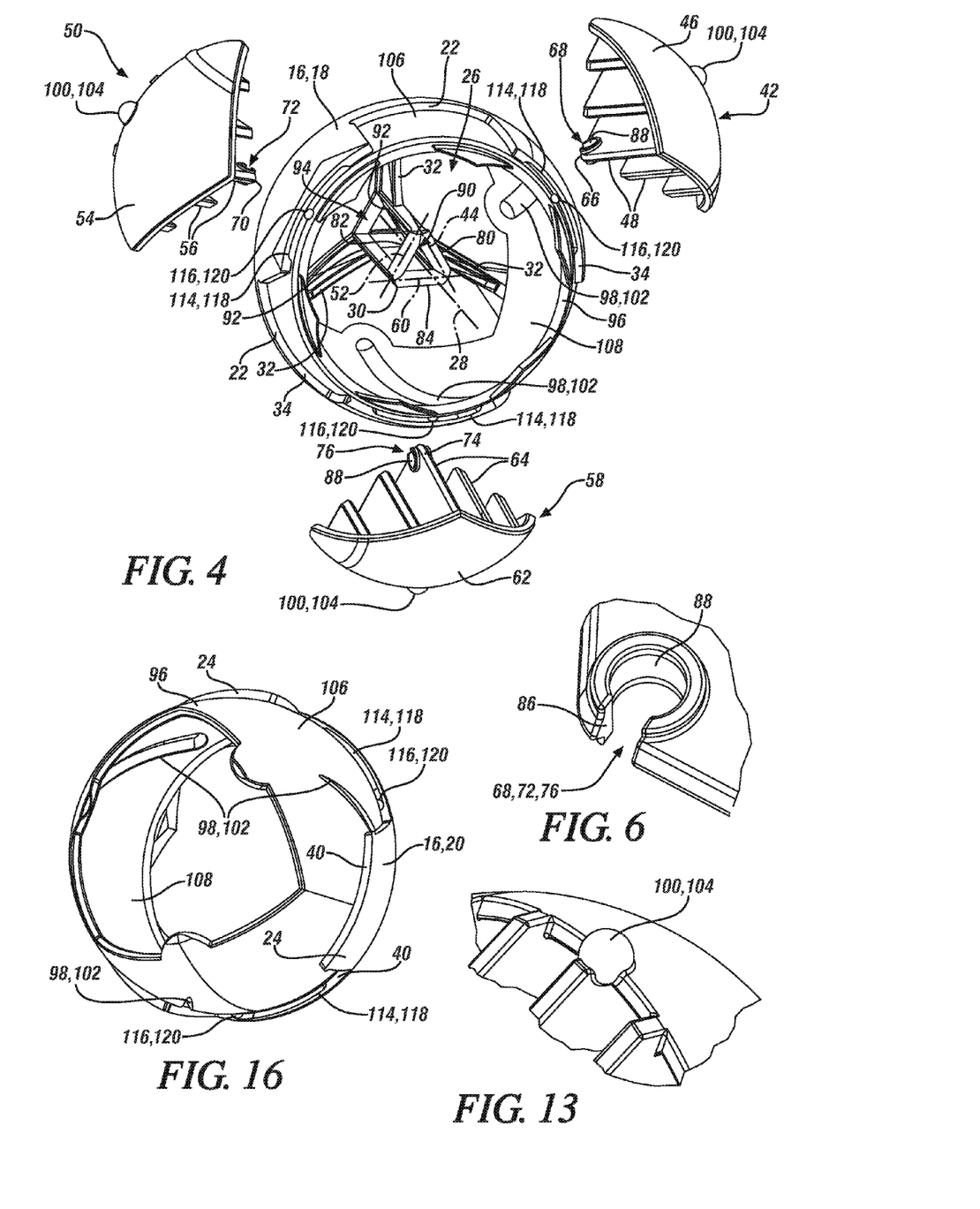
FIG. 4 is a schematic perspective exploded view of a first outlet component, a second outlet component and a third outlet component relative to a first housing portion and an adjustment ring.
FIG. 6 is a schematic perspective view of a fastening feature of any of the outlet components.
FIG. 13 is a schematic fragmentary perspective view of the second guide feature of one of the outlet components.
FIG. 16 is a schematic perspective view of the adjustment ring and a second housing portion.

As best shown in FIG. 4, the housing 16 can include one or more arms 32 extending toward the central axis 28, with the central support 30 being supported by the arm(s) 32. For example, the arm(s) 32 can extend from the first housing portion 18.

Referring back to FIG. 3, the first housing portion 18 can include a first edge 34 and a second edge 36 spaced from each other, with the first edge 34 facing the second housing portion 20. In certain embodiments, the cutout(s) 22 are defined in the first edge 34 and the arm(s) 32 can extend outwardly from the second edge 36. It is to be appreciated that the arm(s) 32 can extend from the housing 16 in any suitable location and configuration.

Continuing with FIG. 3, the second housing portion 20 can include a front edge 38 and a back edge 40 spaced from each other. The back edge 40 of the second housing portion 20 faces the first edge 34 of the first housing portion 18. In certain embodiments, the tab(s) 24 are defined in the back edge 40. Therefore, in certain embodiments, the first edge 34 of the first housing portion 18 and the back edge 40 of the second housing portion 20 engage each other.

Figure 5:
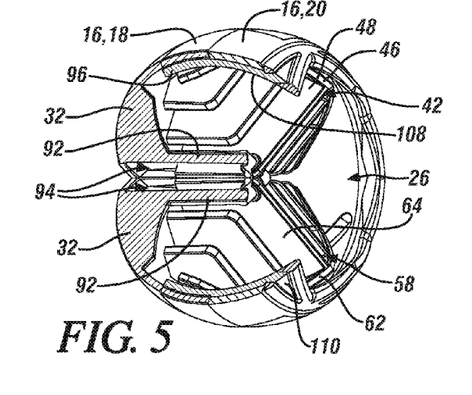
FIG. 5 is a schematic perspective cross-sectional view of a housing and the adjustment ring.

Referring to FIG. 5, the airflow outlet assembly 14 further includes a first outlet component 42 at least partially disposed in the aperture 26 of the housing 16. The central support 30 includes a first segment 80 having a first axis 44 substantially aligning with the first segment 80. The first outlet component 42 is rotatably coupled to the central support 30 about the first axis 44 (compare FIGS. 7 and 8). Specifically, the first outlet component 42 is rotatable about the first axis 44 relative to the housing 16. Referring back to FIGS. 3 and 4, the first outlet component 42 includes a first plate 46 and a first vane 48 extending outwardly from the first plate 46 toward the central axis 28. Generally, the first axis 44 is spaced from the central axis 28 and disposed transverse to the central axis 28.

The airflow outlet assembly 14 also includes a second outlet component 50 at least partially disposed in the aperture 26 of the housing 16. The central support 30 includes a second segment 82 having a second axis 52 substantially aligning with the second segment 82. Generally, the first and second outlet components 42, 50 are disposed adjacent to each other. The second outlet component 50 is rotatably coupled to the central support 30 about the second axis 52 (compare FIGS. 7 and 8). Specifically, the second outlet component 50 is rotatable about the second axis 52 relative to the housing 16. The second outlet component 50 includes a second plate 54 and a second vane 56 extending outwardly from the second plate 54 toward the central axis 28. Generally, the second axis 52 is spaced from the central axis 28 and disposed transverse to the central axis 28.

The first and second outlet components 42, 50 are rotatable concurrently with each other relative to the central support 30 about the respective first and second axes 44, 52 to change the position of the first and second plates 46, 54 and the first and second vanes 48, 56 relative to the housing 16 such that the first and second plates 46, 54 selectively close and open the aperture 26. Therefore, the first and second plates 46, 54 selectively cover the aperture 26. Rotation of the first and second outlet components 42, 50 changes the position of the first and second plates 46, 54 which changes an amount of fluid communication out of the airflow outlet assembly 14. As such, the position of the first and second plates 46, 54 relative to the housing 16 determines the amount of airflow through the aperture 26 and into the passenger compartment 10. Thus, the amount of airflow, i.e., heated air, ambient air and/or cooled air, into the passenger compartment 10 can be adjusted as desired by an occupant of the passenger compartment 10. Rotation of the outlet components 42, 50, 58 will be discussed further below.

In certain embodiments, the airflow outlet assembly 14 can include a third outlet component 58 at least partially disposed in the aperture 26 of the housing 16. Generally, the first, second and third outlet components 42, 50, 58 are disposed adjacent to each other. The central support 30 can include a third segment 84 having a third axis 60 substantially aligning with the third segment 84. The third outlet component 58 is rotatably coupled to the central support 30 about the third axis 60 (compare FIGS. 7 and 8). The third outlet component 58 can include a third plate 62 and a third vane 64 extending outwardly from the third plate 62 toward the central axis 28. Generally, the third axis 60 is spaced from the central axis 28 and disposed transverse to the central axis 28. The airflow outlet assembly 14 can include more than three outlet components 42, 50, 58 and the Figures are for illustrative purposes only. Furthermore, the outlet components 42, 50, 58 can be a substantially identical configuration.

Figure 7:
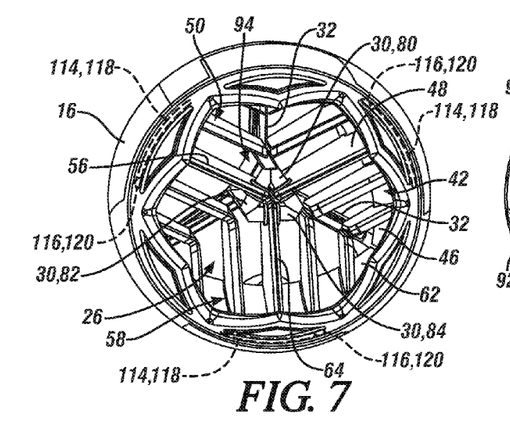
FIG. 7 is a schematic perspective view of the first, second and third outlet components in the fully open position, with a plurality of third and fourth guide features illustrated in evenly spaced dashed lines, and the position of the fourth guide features corresponding to the fully open position.
Figure 8:
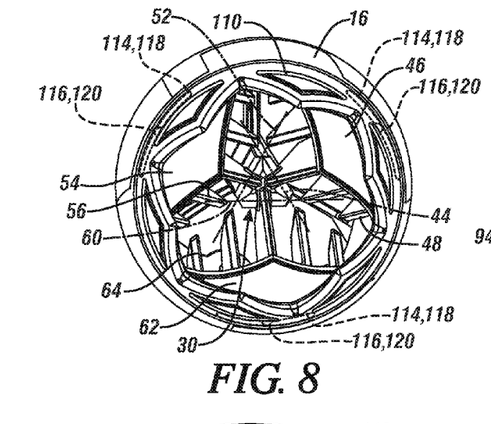
FIG. 8 is a schematic perspective view of the first, second and third outlet components in a partially open/closed position, with the third and fourth guide features illustrated in evenly spaced dashed lines, and the position of the fourth guide features corresponding to the partially open/closed position.
Figure 9:
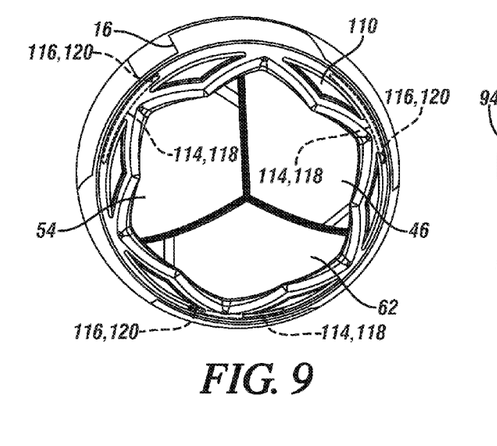
FIG. 9 is a schematic perspective view of the first, second and third outlet components in the fully closed position, with the third and fourth guide features illustrated in evenly spaced dashed lines, and the position of the fourth guide features corresponding to the fully closed position.
Figure 10:
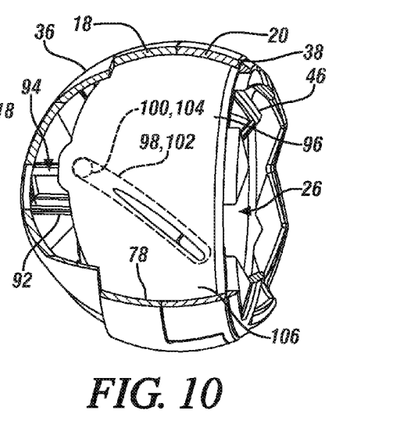
FIG. 10 is a schematic perspective cross-sectional view of the housing to illustrate the adjustment ring and the outlet components in the fully open position, and a position of a first guide feature and a second guide feature corresponding to the fully open position.
Figure 11:
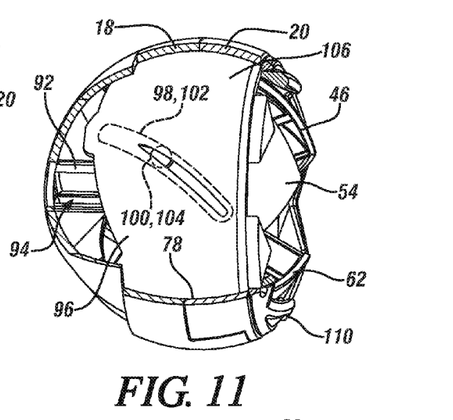
FIG. 11 is a schematic perspective cross-sectional view of the housing to illustrate the adjustment ring and the outlet components in the partially open/closed position, and the position of the first and second guide features corresponding to the partially open/closed position.
Figure 12:
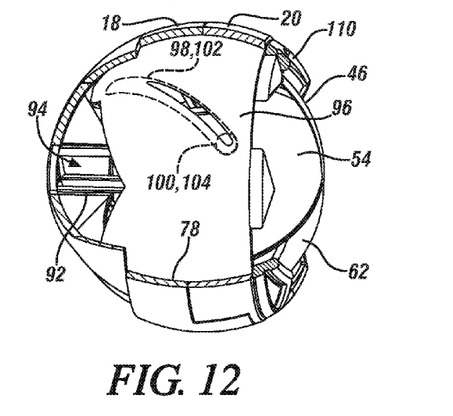
FIG. 12 is a schematic perspective cross-sectional view of the housing to illustrate the adjustment ring and the outlet components in the fully closed position, and the position of the first and second guide features corresponding to the fully closed position.

When comparing FIGS. 7-9, the first, second and third outlet components 42, 50, 58 are rotatable concurrently with each other relative to the central support 30 about the respective first, second and third axes 44, 52, 60 to change the position of the first, second and third plates 46, 54, 62 and the first, second and third vanes 48, 56, 64 relative to the housing 16 such that the first, second and third plates 46, 54, 62 cooperate to selectively close and open the aperture 26. Therefore, the first, second and third plates 46, 54, 62 selectively cover the aperture 26. As discussed above, rotation of the first, second and third outlet components 42, 50, 58 changes the position of the first, second and third plates 46, 54, 62 which changes an amount of fluid communication out of the airflow outlet assembly 14. The first, second and third outlet components 42, 50, 58 can be rotated to a fully open position as best shown in FIGS. 2, 7, 10 and 14, can be rotated to a fully closed position as best shown in FIGS. 9 and 12 and can be rotated to a partially open/closed position as shown in FIGS. 8 and 11.

As suggested by the Figures, when the first, second and third outlet components 42, 50, 58 are in the fully open position, a maximum amount of airflow is in fluid communication with the passenger compartment 10, and thus, the maximum amount of airflow moves out of the aperture 26. Furthermore, as suggested by the Figures, when the first, second and third outlet components 42, 50, 58 are in the fully closed position, a minimum amount of airflow is in fluid communication with the passenger compartment 10, and thus, the minimum amount of airflow moves out of the aperture 26. When the first, second and third outlet components 42, 50, 58 are in the fully closed position, the first, second and third plates 46, 54, 62 abut each other to cover or close the aperture 26. Additionally, as suggested by the Figures, when the first, second and third outlet components 42, 50, 58 are in the partially open/closed position, a reduced amount of airflow is in fluid communication with the passenger compartment 10, and thus, the reduced amount of airflow moves out of the aperture 26. In other words, when in the partially open/closed position, the first, second and third outlet components 42, 50, 58 partially blocks or impedes the airflow with the passenger compartment 10 which reduces the amount of airflow as compared to the fully open position. When the first, second and third outlet components 42, 50, 58 are in the partially open/closed position or fully open position, the first, second and third plates 46, 54, 62 are spaced from each other.

Turning to FIGS. 3, 4 and 7, in certain embodiments, the first vane 48 extends to a first distal portion 66 that includes a first fastening feature 68 engaging the central support 30 to rotatably couple the first outlet component 42 to the housing 16. Furthermore, in certain embodiments, the second vane 56 extends to a second distal portion 70 that includes a second fastening feature 72 engaging the central support 30 to rotatably couple the second outlet component 50 to the housing 16. Additionally, in certain embodiments, the third vane 64 extends to a third distal portion 74 that includes a third fastening feature 76 engaging the central support 30 to rotatably couple the third outlet component 58 to the housing 16. The fastening features 68, 72, 76 will be discussed further below.

As best shown in FIG. 3, the first vane 48 can be further defined as a plurality of first vanes 48 each extending from the first plate 46 in a spaced relationship. Generally, one of the first vanes 48 includes the first fastening feature 68. Specifically, one of the first vanes 48 extends to the first distal portion 66 that includes the first fastening feature 68 which engages the central support 30 to rotatably couple the first outlet component 42 to the housing 16. For example, a middle one of the first vanes 48 can include the first fastening feature 68. The first fastening feature 68 can be in other locations than illustrated in the Figures. Furthermore, the first vanes 48 can extend from the first plate 46 in any suitable location and configuration.

Furthermore, the second vane 56 can be further defined as a plurality of second vanes 56 each extending from the second plate 54 in a spaced relationship. Generally, one of the second vanes 56 includes the second fastening feature 72. Specifically, one of the second vanes 56 extends to the second distal portion 70 that includes the second fastening feature 72 which engages the central support 30 to rotatably couple the second outlet component 50 to the housing 16. For example, a middle one of the second vanes 56 can include the second fastening feature 72. The second fastening feature 72 can be in other locations than illustrated in the Figures. Furthermore, the second vanes 56 can extend from the second plate 54 in any suitable location and configuration.

Also, the third vane 64 can be further defined as a plurality of third vanes 64 each extending from the third plate 62 in a spaced relationship. Generally, one of the third vanes 64 including the third fastening feature 76. Specifically, one of the third vanes 64 extends to the third distal portion 74 that includes the third fastening feature 76 which engages the central support 30 to rotatably couple the third outlet component 58 to the housing 16. For example, a middle one of the third vanes 64 can include the third fastening feature 76. The third fastening feature 76 can be in other locations than illustrated in the Figures. Furthermore, the third vanes 64 can extend from the third plate 62 in any suitable location and configuration.

The first vanes 48, the second vanes 56 and the third vanes 64 can each be attached to the first, second and third plates 46, 54, 62 respectively by any suitable methods. For example, in certain embodiments, the first vanes 48 are integral with the first plate 46, similarly, the second vanes 56 are integral with the second plate 54, and the third vanes 64 are integral with the third plate 62. Therefore, for example, the first vanes 48 and the first plate 46 can be molded as one piece, similarly, the second vanes 56 and the second plate 54 can be molded as one piece, and the third vanes 64 and the third plate 62 can be molded as one piece. In other embodiments, the first, second and third vanes 48, 56, 64 are attached to the respective first, second and third plates 46, 54, 62 by fasteners, adhesive, welding, etc. As such, the first plate 46 and the first vanes 48 rotate about the first axis 44 in unison or as a unit. Said differently, the first plate 46 and the first vanes 48 move concurrently with each other. Similarly, the second plate 54 and the second vanes 56 rotate about the second axis 52 in unison or as a unit. Said differently, the second plate 54 and the second vanes 56 move concurrently with each other. In addition, the third plate 62 and the third vanes 64 rotate about the third axis 60 in unison or as a unit. Said differently, the third plate 62 and the third vanes 64 move concurrently with each other.

Turning to FIG. 3, generally, the central support 30 is spaced from an inner surface 78 of the housing 16. Also referring to FIG. 4, as discussed above, the central support 30 can include the first segment 80 and the second segment 82. The first fastening feature 68 can engage the first segment 80 such that the first outlet component 42 is rotatable about the first segment 80 and the second fastening feature 72 can engage the second segment 82 such that the second outlet component 50 is rotatable about the second segment 82.

In certain embodiments, the central support 30 can include the third segment 84, as discussed above. The third fastening feature 76 can engage the third segment 84 such that the third outlet component 58 is rotatable about the third segment 84. Therefore, the central support 30 can include the first segment 80, the second segment 82 and the third segment 84 disposed adjacent to each other. FIG. 3 also illustrates the central support 30 in phantom lines to show the generally alignment of the fastening features 68, 72, 76 relative to each segment 80, 82, 84 of the central support 30.

Referring to FIG. 6, the first, second and third fastening features 68, 72, 76 can each be further defined as a slit 86 that opens to a cavity 88 such that the first, second and third distal portions 66, 70, 74 are each biasable to insert the respective first, second and third segments 80, 82, 84 through the respective slit 86 and retain the respective segments 80, 82, 84 in the respective cavity 88. The first, second and third fastening features 68, 72, 76 can be clips or any suitable configuration, and the slit 86/cavity 88 is one suitable example.

As best shown in FIGS. 3, 4 and 7, the first segment 80, the second segment 82 and the third segment 84 can cooperate with each other to form a generally triangular configuration defining a space 90 (the space 90 is numbered in FIG. 4) between the segments 80, 82, 84. Generally, the central axis 28 is disposed through the space 90. At least a portion of the fastening features 68, 72, 76 and/or a portion of the vanes 48, 56, 64 move within the space 90 during rotation of the outlet components 42, 50, 58. As such, the space 90 provides room for the outlet components 42, 50, 58 to rotate without interference from the adjacent outlet components 42, 50, 58 or interference from the central support 30.

The first, second and third segments 80, 82, 84 are disposed adjacent to each other to form the generally triangular configuration. Therefore, the first, second and third segments 80, 82, 84 can surround the central axis 28. As such, the first, second and third axes 44, 52, 60 can cooperate to surround the central axis 28. In certain embodiments, the first, second and third axes 44, 52, 60 can intersect each other. When more than three outlet components 42, 50, 58 are being utilized, such as when four outlet components are being utilized, the central support 30 can include four segments that cooperate to form a generally square or rectangular configuration defining the space 90 therebetween. In the four segment embodiment, for example, there are four axes, i.e., one aligning with each of the four segments, that can surround the central axis 28, and only certain of the axes can intersect each other. The central support 30 can be any suitable location relative to the central axis 28 and any suitable configuration, and the above are non-limiting examples.

As best shown in FIGS. 4 and 5, the central support 30 can also include a transition portion 92 disposed between the arms 32 and the first, second and third segments 80, 82, 84. The transition portion 92 can include a plurality of gaps 94 which allows a portion of the vanes 48, 56, 64 to be disposed in the respective gaps 94 when the vanes 48, 56, 64 are in the fully open position. Therefore, the gaps 94 provide room for the outlet components 42, 50, 58 to rotate without interference from the central support 30. For example, a portion of the vanes 48, 56, 64 including the respective fastening feature can be selectively disposed in the respective gaps 94. Therefore, movement of the vanes 48, 56, 64 is not restricted by the central support 30.

Referring to FIGS. 3-5, the airflow outlet assembly 14 can include an adjustment ring 96 at least partially surrounded by the housing 16. The adjustment ring 96 is rotatable about the central axis 28 relative to the housing 16 which rotates the first, second and third outlet components 42, 50, 58 concurrently about the central support 30 such that the first, second and third plates 46, 54, 62 selectively close and open the aperture 26 (see FIGS. 10-12). Therefore, the first, second and third plates 46, 54, 62 concurrently rotate to selectively cover the aperture 26. In other words, rotation of the adjustment ring 96 moves the first, second and third outlet components 42, 50, 58 between the fully closed position, the fully open position and the partially open/closed position.

As best shown in FIGS. 3 and 4, the adjustment ring 96 can include a plurality of first guide features 98 and each of the outlet components 42, 50, 58 can include a second guide feature 100 cooperating with the respective first guide features 98 to guide movement of the outlet components 42, 50, 58 relative to the central support 30 during rotation of the adjustment ring 96. In certain embodiments, each of the outlet components 42, 50, 58 can include more than one second guide feature 100.

The first guide features 98 can be further defined as a plurality of pathways 102 spaced from each other and the second guide feature 100 of each of the outlet components 42, 50, 58 can be further defined as a protrusion 104 (also see FIG. 13) extending outwardly away from the central axis 28 and disposed in the respective pathways 102. Therefore, the pathways 102 can be defined in the adjustment ring 96 and each of the outlet components 42, 50, 58 can include the protrusion 104. For example, one of the first vanes 48 and/or the first plate 46 can include one protrusion 104, one of the second vanes 56 and/or the second plate 54 can include one protrusion 104 and one of the third vanes 64 and/or the third plate 62 can include one protrusion 104. Alternatively, one of the pathways 102 is defined in each of the outlet components 42, 50, 58 and a plurality of protrusions 104 extends from the adjustment ring 96 in a spaced relationship. The first and second guide features 98, 100 can be any suitable configuration, and the pathways 102 and the protrusions 104 are one suitable example.

The adjustment ring 96 is spaced from the central axis 28 and generally surrounds the first, second and third outlet components 42, 50, 58. The adjustment ring 96 can include an outer side 106 (see FIG. 3) that faces the inner surface 78 of the housing 16 and an inner side 108 facing the central axis 28. Therefore, the outer and inner sides 106, 108 oppose each other. Rotation of the adjustment ring 96 about the central axis 28 causes the first, second and third outlet components 42, 50, 58 to move relative to the inner side 108 in a different direction from rotation of the adjustment ring 96 (compare FIGS. 7-12). Specifically, rotation of the adjustment ring 96 about the central axis 28 causes the first, second and third outlet components 42, 50, 58 to rotate about the respective first, second and third axes 44, 52, 60 which moves the first, second and third plates 46, 54, 62 forward toward the front edge 38 of the second housing portion 20 or backward toward the second edge 36 of the first housing portion 18. Said differently, the first, second and third outlet components 42, 50, 58 rotate about the respective axes 44, 52, 60 as the adjustment ring 96 rotates about the central axis 28 which causes the plates 46, 54, 62 to move forward or backward relative to the adjustment ring 96 along the central axis 28 (again compare FIGS. 7-12).

Turning to FIGS. 3 and 10-12, the pathways 102 can be defined along the inner side 108 of the adjustment ring 96. In other words, the pathways 102 generally face the respective protrusions 104, and correspondingly, the protrusions 104 face the respective pathways 102. The pathways 102 can extend through the outer and inner sides 106, 108 or partially through the outer side 106. Furthermore, as best shown in FIGS. 3, 4, 10-12 and 16, the pathways 102 are disposed angularly or curved relative to the central axis 28 such that rotation of the adjustment ring 96 causes the outlet components 42, 50, 58 to move in a different direction from the adjustment ring 96.

Generally, the adjustment ring 96 can include a grip 110 (see FIGS. 2, 7-9 and 14) to rotate the adjustment ring 96 which correspondingly moves the outlet components 42, 50, 58 between the positions. As best shown in FIG. 3, a front portion 112 of the adjustment ring 96 can include the grip 110. The grip 110 can be exposed outside of the housing 16 for easy access from the passenger compartment 10. The grip 110 can be any suitable configuration and the Figures illustrate one suitable configuration of the grip 110. For example, the grip 110 can be a handle, a knob, one or more recesses, etc.

Referring to FIGS. 3, 4, 15 and 16, the housing 16 can include a plurality of third guide features 114 and the adjustment ring 96 can include a plurality of fourth guide features 116 cooperating with the respective third guide features 114 to limit rotation of the adjustment ring 96 relative to the housing 16. In certain embodiments, the third guide features 114 are further defined as a plurality of channels 118 spaced from each other and the fourth guide features 116 are further defined as a plurality of protuberances 120 extending outwardly away from the central axis 28 and disposed in the respective channels 118. Simply stated, the channels 118 can be defined in the housing 16 and the protuberances 120 can extend from the adjustment ring 96. In certain embodiments, the first and second housing portions 18, 20 cooperate to each define the channels 118 (see FIG. 15). Additionally, the protuberances 120 can extend from the outer side 106 of the adjustment ring 96 (see FIG. 3). Alternatively, each of the channels 118 are defined in the adjustment ring 96 and the protuberances 120 can extend from the housing 16. The third and fourth guide features 114, 116 can be any suitable configuration, and the channels 118 and the protuberances 120 are one suitable example.

For example, as shown in FIG. 7, when the protuberances 120 are disposed adjacent to one of the ends of the respective channels 118, the vanes 48, 56, 64 and the plates 46, 54, 62 are in the fully open position. As shown in FIG. 9, when the protuberances 120 are disposed adjacent to the other one of the ends of the respective channels 118, the vanes 48, 56, 64 and the plates 46, 54, 62 are in the fully closed position. As shown in FIG. 8, when the protuberances 120 are spaced from both of the ends of the respective channels 118, the vanes 48, 56, 64 and the plates 46, 54, 62 are in the partially open/closed position. The Figures illustrate rotation of the adjustment ring 96 in a clockwise direction which causes the vanes 48, 56, 64 and the plates 46, 54, 62 to move to the fully closed position, however, alternatively, the third and fourth guide features 114, 116 can be designed to allow rotation of the adjustment ring 96 in a counter-clockwise direction which causes the vanes 48, 56, 64 and the plates 46, 54, 62 to move to the fully closed position.

Figure 14:
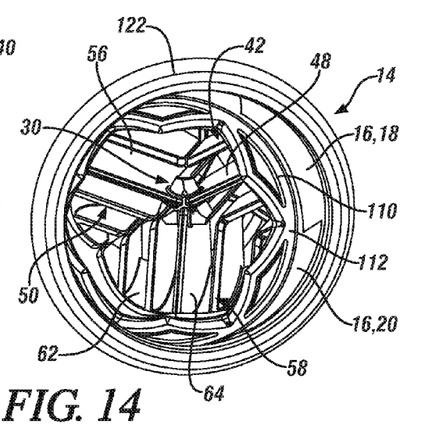
FIG. 14 is a schematic perspective view of the outlet components in the fully open position, with the housing, the adjustment ring and the outlet components oriented in a different direction from FIG. 2 to change the airflow direction as compared to FIG. 2.
Figure 15:
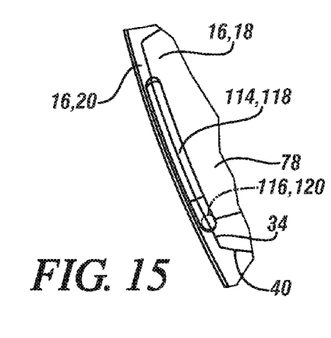
FIG. 15 is a schematic fragmentary perspective view of an inner surface of the housing illustrating one of the third guide features and illustrating one of the fourth guide features in phantom lines.

As discussed above, the adjustment ring 96 is rotatable to move the first, second and third outlet components 42, 50, 58 between the fully open position, the fully closed position and the partially open/closed position. Furthermore, the adjustment ring 96 and the first, second and third outlet components 42, 50, 58 are movable together between an up and down position and a side to side position. Generally, the up and down position changes the position of the adjustment ring 96 and the outlet components 42, 50, 58 up and down relative to the dashboard 12 which reorients the direction the airflow enters the passenger compartment 10, i.e., reorients the direction of the airflow up or down. The side to side position changes the position of the adjustment ring 96 and the outlet components 42, 50, 58 left and right relative to the dashboard 12 which reorients the direction the airflow enters the passenger compartment 10, i.e., reorients the direction of the airflow left or right. FIG. 14 illustrates one of the side to side positions.

Turning back to FIG. 3, the airflow outlet assembly 14 can include one or more of a trim member 122, a sleeve 124, a fitting 126 and an outer housing 128. The sleeve 124 surrounds the adjustment ring 96 and the housing 16, and the adjustment ring 96 and the housing 16 can move relative to the sleeve 124 between the up and down position and the side to side position. Furthermore, the outer housing 128 surrounds the sleeve 124, and thus the adjustment ring 96 and the housing 16, and the adjustment ring 96 and housing 16 can move relative to the outer housing 128 between the up and down position and the side to side position. Additionally, the first, second and third outlet components 42, 50, 58 can move relative to the sleeve 124 and the outer housing 128 between the fully open position, the fully closed position and the partially open/closed position. Therefore, the sleeve 124 and the outer housing 128 remain stationary.

The outer housing 128 can be formed as a single or unitary piece or a plurality of pieces. For example, as shown in FIG. 3, the outer housing 128 can include a first outer portion 130 and a second outer portion 132, i.e., the plurality of pieces. When formed of more than one piece, the first and second outer portions 130, 132 cooperate with each other. It is to be appreciated that the first and second outer portions 130, 132 can include one or more of tabs, fasteners, clips, snaps, cutouts, etc. to attach or secure the first and second outer portions 130, 132 together.

Continuing with FIG. 3, the outer housing 128 can include a front edge 134 and a back edge 136 spaced from each other along the central axis 28. The front edge 134 of the outer housing 128 faces the passenger compartment 10 and the back edge 136 of the outer housing 128 faces away from the passenger compartment 10. The trim member 122 covers the front edge 134 of the outer housing 128 and can be visible from inside the passenger compartment 10. Generally, the trim member 122 remains stationary. The back edge 136 of the outer housing 128 cooperates with a duct of the HVAC unit and is not visible from inside the passenger compartment 10. The fitting 126 can be coupled to the back edge 136 of the outer housing 128 and can cooperate with the duct to minimize airflow leaking out between the back edge 136 of the outer housing 128 and the duct.

The outer housing 128 can include one or more couplings 138 to secure the airflow outlet assembly 14 to the dashboard 12. For example, one or more of the couplings 138 can extend from each of the first and second outer portions 130, 132. The couplings 138 can be one or more of tabs, fasteners, clips, snaps, cutouts, etc. to attach or secure the airflow outlet assembly 14 to the dashboard 12.

The airflow outlet assembly 14 can eliminate the rotary knob and the drive mechanism as discussed in the background section. The airflow outlet assembly 14 also minimizes the size of the outlet components 42, 50, 58 while providing the desired airflow with the passenger compartment 10. Specifically, the airflow outlet assembly 14 is sized to minimize a fore-aft depth 140 (see FIG. 2), which reduces the packaging space 90 and can increase aesthetics of the airflow outlet assembly 14. The fore-aft depth 140 extends along the central axis 28. For example, the fore-aft depth 140 of the airflow outlet assembly 14 can be reduced from about 11.0 millimeters as compared to the vent described in the background section. Additionally, the area that the airflow can flow through the airflow outlet assembly 14 is larger than the vent discussed in the background section. As such, more airflow can be in communication with the passenger compartment 10 utilizing the airflow outlet assembly 14 described herein as compared to the vent described in the background section.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An airflow outlet assembly comprising:
   a housing defining an aperture extending along a central axis and including a central support disposed in the aperture proximal to the central axis;
   wherein the central support includes a first segment having a first axis substantially aligning with the first segment and a second segment having a second axis substantially aligning with the second segment, and wherein the first and second axes are each spaced from the central axis and each disposed transverse to the central axis;
   a first outlet component at least partially disposed in the aperture of the housing and rotatably coupled to the central support about the first axis, proximate to the central axis, with the first outlet component including a first plate and a first vane extending outwardly from the first plate toward the central axis;
   a second outlet component at least partially disposed in the aperture of the housing and rotatably coupled to the central support about the second axis, proximate to the central axis, with the second outlet component including a second plate and a second vane extending outwardly from the second plate toward the central axis; and
   wherein the first and second outlet components are rotatable concurrently with each other relative to the central support about the respective first and second axes to change the position of the first and second plates and the first and second vanes relative to the housing such that the first and second plates selectively close and open the aperture.

2. The assembly as set forth in claim 1 wherein:
   the first vane extends to a first distal portion that includes a first fastening feature engaging the central support to rotatably couple the first outlet component to the housing; and
   the second vane extends to a second distal portion that includes a second fastening feature engaging the central support to rotatably couple the second outlet component to the housing.

3. The assembly as set forth in claim 2 wherein the first fastening feature engages the first segment such that the first outlet component is rotatable about the first segment and the second fastening feature engages the second segment such that the second outlet component is rotatable about the second segment.

4. The assembly as set forth in claim 3 wherein the first and second fastening features are each further defined as a slit that opens to a cavity such that the first and second distal portions are each biasable to insert the respective first and second segments through the respective slit and retain the respective segments in the respective cavity.

5. The assembly as set forth in claim 1 wherein the central support includes a third segment having a third axis substantially aligning with the third segment, and wherein the third axis is spaced from the central axis and disposed transverse to the central axis, and further including a third outlet component at least partially disposed in the aperture of the housing and rotatably coupled to the central support about the third axis, proximate to the central axis, with the third outlet component including a third plate and a third vane extending outwardly from the third plate toward the central axis, and wherein the first, second and third outlet components are rotatable concurrently with each other relative to the central support about the respective first, second and third axes to change the position of the first, second and third plates and the first, second and third vanes relative to the housing such that the first, second and third plates cooperate to selectively close and open the aperture.

6. The assembly as set forth in claim 5 wherein:
the first vane extends to a first distal portion that includes a first fastening feature engaging the central support to rotatably couple the first outlet component to the housing;
the second vane extends to a second distal portion that includes a second fastening feature engaging the central support to rotatably couple the second outlet component to the housing; and
the third vane extends to a third distal portion that includes a third fastening feature engaging the central support to rotatably couple the third outlet component to the housing.

7. The assembly as set forth in claim 6 wherein:
the first vane is further defined as a plurality of first vanes each extending from the first plate in a spaced relationship, with one of the first vanes including the first fastening feature;
the second vane is further defined as a plurality of second vanes each extending from the second plate in a spaced relationship, with one of the second vanes including the second fastening feature; and
the third vane is further defined as a plurality of third vanes each extending from the third plate in a spaced relationship, with one of the third vanes including the third fastening feature.

8. The assembly as set forth in claim 6 wherein:
the first, second and third segments are disposed adjacent to each other; the first fastening feature engages the first segment such that the first outlet component is rotatable about the first segment;
the second fastening feature engages the second segment such that the second outlet component is rotatable about the second segment; and
the third fastening feature engages the third segment such that the third outlet component is rotatable about the third segment.

9. The assembly as set forth in claim 8 wherein the first, second and third fastening features are each further defined as a slit that opens to a cavity such that the first, second and third distal portions are each biasable to insert the respective first, second and third segments through the respective slit and retain the respective segments in the respective cavity.

10. The assembly as set forth in claim 8 wherein the first segment, the second segment and the third segment cooperate with each other to form a generally triangular configuration defining a space between the segments, with the central axis disposed through the space.

11. The assembly as set forth in claim 1 further including an adjustment ring at least partially surrounded by the housing and rotatable about the central axis relative to the housing which rotates the first and second outlet components concurrently about the central support such that the first and second plates selectively close and open the aperture.

12. The assembly as set forth in claim 11 wherein the adjustment ring includes a plurality of first guide features and each of the outlet components include a second guide feature cooperating with the respective first guide features to guide movement of the outlet components relative to the central support during rotation of the adjustment ring.

13. The assembly as set forth in claim 12 wherein the first guide features are further defined as a plurality of pathways spaced from each other and the second guide feature of each of the outlet components is further defined as a protrusion extending outwardly away from the central axis and disposed in the respective pathways.

14. The assembly as set forth in claim 11 wherein the housing includes a plurality of third guide features and the adjustment ring includes a plurality of fourth guide features cooperating with the respective third guide features to limit rotation of the adjustment ring relative to the housing.

15. The assembly as set forth in claim 14 wherein the third guide features are further defined as a plurality of channels spaced from each other and the fourth guide features are further defined as a plurality of protuberances extending outwardly away from the central axis and disposed in the respective channels.

16. A passenger compartment for a vehicle; the passenger compartment comprising:
a dashboard;
an airflow outlet assembly coupled to the dashboard, the assembly including:
a housing defining an aperture extending along a central axis and including a central support disposed in the aperture proximal to the central axis;
wherein the central support includes a first segment having a first axis substantially aligning with the first segment, a second segment having a second axis substantially aligning with the second segment and a third segment having a third axis substantially aligning with the third segment, and wherein the first, second and third axes are each spaced from the central axis and each disposed transverse to the central axis;
a first outlet component at least partially disposed in the aperture of the housing and rotatably coupled to the central support about the first axis, proximate to the central axis, with the first outlet component including a first plate and a first vane extending outwardly from the first plate toward the central axis;
a second outlet component at least partially disposed in the aperture of the housing and rotatably coupled to the central support about the second axis, proximate to the central axis, with the second outlet component including a second plate and a second vane extending outwardly from the second plate toward the central axis;

a third outlet component at least partially disposed in the aperture of the housing and rotatably coupled to the central support about the third axis, proximate to the central axis, with the third outlet component including a third plate and a third vane extending outwardly from the third plate toward the central axis; and wherein the first, second and third outlet components are rotatable concurrently with each other relative to the central support about the respective first, second and third axes to change the position of the first, second and third plates and the first, second and third vanes relative to the housing such that the first, second and third plates cooperate to selectively close and open the aperture.

17. The assembly as set forth in claim 16 wherein:

the first vane is further defined as a plurality of first vanes each extending from the first plate in a spaced relationship, with one of the first vanes extending to a first distal portion that includes a first fastening feature engaging the central support to rotatably couple the first outlet component to the housing;

the second vane is further defined as a plurality of second vanes each extending from the second plate in a spaced relationship, with one of the second vanes extending to a second distal portion that includes a second fastening feature engaging the central support to rotatably couple the second outlet component to the housing; and the third vane is further defined as a plurality of third vanes each extending from the third plate in a spaced relationship, with one of the third vanes extending to a third distal portion that includes a third fastening feature engaging the central support to rotatably couple the third outlet component to the housing.

18. The assembly as set forth in claim 17 wherein:

the first segment, the second segment and the third segment are disposed adjacent to each other to form a generally triangular configuration defining a space between the segments, with the central axis disposed through the space;

the first fastening feature engages the first segment such that the first outlet component is rotatable about the first segment;

the second fastening feature engages the second segment such that the second outlet component is rotatable about the second segment; and the third fastening feature engages the third segment such that the third outlet component is rotatable about the third segment.

19. The assembly as set forth in claim 18 wherein the first, second and third fastening features are each further defined as a slit that opens to a cavity such that the first, second and third distal portions are each biasable to insert the respective first, second and third segments through the respective slit and retain the respective segments in the respective cavity.

20. The assembly as set forth in claim 16 further including an adjustment ring at least partially surrounded by the housing and rotatable about the central axis relative to the housing which rotates the first, second and third outlet components concurrently about the central support such that the first, second and third plates selectively close and open the aperture, and wherein the adjustment ring includes a plurality of first guide features and each of the outlet components include a second guide feature cooperating with the respective first guide features to guide movement of the outlet components relative to the central support during rotation of the adjustment ring.

* * * * *